United States Patent [19]

Bramwell

[11] 4,316,864

[45] Feb. 23, 1982

[54] METHOD AND APPARATUS FOR SLIP CASTING TOILET BOWLS

[75] Inventor: John S. Bramwell, Cheshire, United Kingdom

[73] Assignee: American Standard Inc., New York, N.Y.

[21] Appl. No.: 181,284

[22] Filed: Aug. 25, 1980

Related U.S. Application Data

[63] Continuation of Ser. No. 19,544, Mar. 12, 1979, abandoned.

[30] Foreign Application Priority Data

Mar. 10, 1978 [GB] United Kingdom ................ 9687/78

[51] Int. Cl.$^3$ ........................ B29C 5/00; B28B 21/08; B28B 1/26

[52] U.S. Cl. ....................................... 264/86; 249/58; 249/121; 249/122; 249/133; 249/134; 249/141; 249/142; 249/144; 425/451; 425/812

[58] Field of Search .................. 264/86; 249/117, 121, 249/122, 134, 141, 142, 133, 144; 425/451, 812

[56] References Cited

U.S. PATENT DOCUMENTS

| | | | |
|---|---|---|---|
| 1,053,342 | 2/1913 | Ahrens | 264/87 |
| 2,565,356 | 8/1951 | Crane et al. | |
| 3,431,332 | 3/1969 | Cummings | 264/86 |
| 3,461,194 | 8/1969 | Alexander | 264/86 |
| 3,812,229 | 5/1974 | Anderson | 264/86 |

*Primary Examiner*—Willard E. Hoag

*Attorney, Agent, or Firm*—James J. Salerno, Jr.; Robert G. Crooks

[57] ABSTRACT

Method for slip casting toilet bowls and as mould for casting ceramic material in slip form, including a compartment having an air impermeable wall and arranged, in the casting position of the mould, so that when the mould is filled with slip air is trapped in the compartment. The compartment is located at a region where casting is not to occur and the trapped air not only achieves this but also prevents the surface of the compartment from becoming wetted, thereby making subsequent cleaning easier. The compartment may be formed either in a plaster mould part and its surface rendered air impermeable, or in a separate part made of air impermeable material, and assembled with the plaster mould parts. The mould is particularly suitable for casting a water-closet bowl, the compartment being located at the region where the open top of the bowl is formed.

12 Claims, 1 Drawing Figure

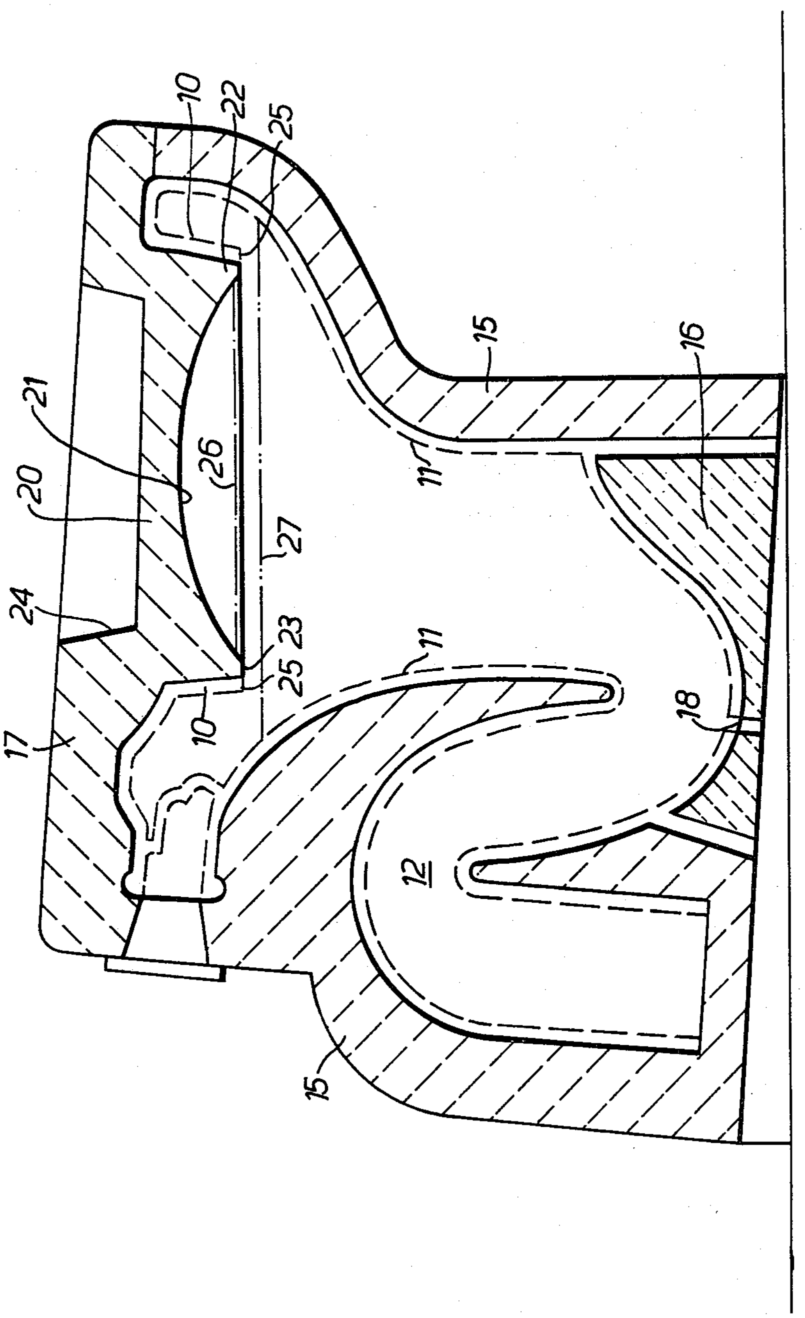
10
22
25
15
16
21
20
26
11
27
24
11
23
25
10
18
17
12
15

METHOD AND APPARATUS FOR SLIP CASTING TOILET BOWLS

This application is a continuation of Application Ser. No. 19,544, filed Mar. 3, 1979, and now abandoned.

SUMMARY OF THE INVENTION

This invention relates to a mould for casting ceramic material in slip form and particularly, although not exclusively, for casting articles of sanitary ware of vitreous china.

The invention, in its broadest aspect, provides a mould for casting ceramic material in slip form including a compartment the wall of which is impermeable to air and which in the casting position of the mould is upwardly closed and downwardly in communication with the casting cavity, whereby when the mould is filled with slip air is trapped in the compartment.

The compartment is located at a region where casting is not to take place, i.e. where a hole or open region of an article is to be formed, and the trapped air not only ensures that the slip does not cast anywhere in the area where the slip level closes the compartment but it also prevents the surface of the compartment from even becoming wetted with slip, thereby making cleaning easier.

The compartment may be provided integrally in a mould part made of plaster of Paris, the internal surface of the compartment being rendered impermeable to air, for example by coating or lining it with a resin or plastics. Alternatively, the compartment may be provided in a separate part which is made of an air impermeable material, for example plastics, and which can be assembled with the other part or parts of the mould made of conventional plaster of Paris.

The compartment is conveniently dome shaped, and the invention is particularly advantageous when the compartment is provided in a mould for drain casting of water-closet bowls at that region where the open top of the bowl is to be formed.

BRIEF DESCRIPTION OF THE DRAWINGS

The invention may be carried into practice in a number of ways but one specific embodiment will now be described, by way of example only, with reference to the accompanying drawing which shows a section on a vertical plane through a mould for casting a water-closet bowl.

DESCRIPTION OF THE PREFERRED EMBODIMENTS

The mould shown in the drawing is shaped for casting a conventional water-closet bowl having an integral flush-water rim 10, a bowl portion 11 and an integral S trap 12. The mould comprises several parts, namely two side parts 15, only one of which is shown, which are substantially symmetrical relative to a vertical parting plane and which each shape half the closet bowl, a lower core or slipper 16, and a rim mould part 17 which fits over the side parts 15 and which shapes the flush-water rim 10, the rim mould part 17 including a sinker portion 20 which is generally oval-shaped in plan and projects down into the interior of the casting cavity.

The side mould parts 15, the slipper 16 and the rim mould part 17 are all made of conventional plaster of Paris so that when the mould is assembled and filled with slip the ceramic material cast-up against the mould cavity faces of those parts which are contacted by the slip, the water from the slip being absorbed by the plaster.

The purpose of the rim mould part 17 and in particular of the sinker portion 20 (apart from providing the annular casting surfaces for casting the flush-water rim of the bowl) is to close the top of the mould so that it can be filled with slip under gravity from a header supply tank and maintained under a slight head of pressure during casting. The central part of the sinker portion 20 is located at a region where there is to be an opening in the article so that it must not provide a casting surface. Another reason for using a sinker is that it occupies some of the interior space which will ultimately be emptied during draining, so that it thereby reduces the volume of slip required to fill the mould.

Hitherto, the sinker has been shaped such that in use the whole of its surface which forms part of the internal cavity of the mould is exposed and is contacted and wetted by the slip when the mould cavity is filled. To avoid casting up of the slip on the wetted surface of the sinker, it has been proposed to make the sinker of resin, or of plaster which has been treated with resin, but even so a film of slip remains on the wetted surfaces after draining so that such a sinker requires laborious cleaning over its entire wetted surface after each casting operation.

In accordance with the invention, the sinker portion 20 includes a compartment the wall of which is impermeable to air, this compartment being formed by an internal dome 21 formed integrally in the rim mould part 17 and surrounded by an annular rim 22 for casting the flush-water rim of the closet bowl. To make the inside of the dome 21 impermeable to air it is coated with a resin over the whole of its domed surface and on an annular edge 23 about half way out to the periphery of the rim 22. When the rim mould part 17 is located on the side mould parts 15, the dome 21 affords the compartment which thus has an airtight internal surface and which is closed upwardly but is downwardly in open communication with the interior casting cavity of the mould. Above the dome 21, the rim mould part 17 is cut away at 24 to reduce its weight.

In the casting position of the mould the lower edge 25 of the flush-water rim is to lie in a generally horizontal plane when the bowl is cast; in the particular example shown in the drawing, the entire mould is therefore tilted towards the front of the bowl to arranged for the flush-water rim to be generally horizontal, but it will be appreciated that for other designs of closet the mould may be tilted towards the back for this purpose, or will not have to be tilted at all. For casting, the mould parts are all clamped securely together.

When the mould is filled with slip by gravity from a header supply tank through a suitable inlet 18 at the bottom of the trap (in other designs the inlet may be at other locations e.g. through the slipper forming an S type trap), the slip level rises in the interior cavity and air is displaced from the cavity through the seams between the mould parts. Once the slip covers the seams they become blocked so that slip cannot escape. When the slip reaches the level of the annular edge 23 of the rim 22 of the sinker portion 20, however, the air in the dome 21 will then be trapped so that as the slip level continues to rise to fill the mould the air in the dome 21 prevents the slip from contacting the inside of the dome 21. When the mould is full, the slip inside will be under pressure depending on the head of slip in the supply tank, for example one meter head of slip. However, because of the air trapped in the dome 21 the slip level will not rise into the dome 21 by more than a small amount, e.g. approximately $\frac{3}{8}''$ to $\frac{1}{2}''$—see the level indicated 26, depending on the slip pressure. The air trapped in the dome will be under slight pressure too.

After casting time has elapsed, excess slip is drained from the mould, for example via the opening 18. At this stage air may be introduced into the mould cavity since otherwise the draining of the slip could cause a suction effect in the top of the mould and this would pull the soft cast clay from the mould wall or otherwise distort the flush-water rim 10. In some embodiments it may be that the air trapped in the dome 21 will itself be adequate to prevent a suction effect occurring without having to introduce air, at least during the initial draining until the slip level drops to a level, indicated 27, about one inch below the edge 23, but it is believed that generally it will be desirable to introduce air during the initial draining.

With the slip level at about one inch below the dome edge 23 draining is stopped for a short time. During this time a small amount of slip will drip from the lower edge 25 of the flush-water rim 10 but these drips will fall into the pool of slip still in the bowl; if such drips were to fall onto the inside of the bowl walls they would disfigure the bowl on the unfinished article which would entail an extra cleaning operation to correct. Of course, since the inside of the dome 21 is not wetted, the amount of slip which will drip off the edge 25 is less than if a sinker without a dome is used.

The rim mould part 17 may be removed at this stage so that thereafter the inside of the mould is open to atmosphere. Alternatively the rim mould part 17 may be left in place for the full draining, air being introduced in the mould to replace the volume of drained slip throughout the draining.

After about three minutes the drips will have stopped and the remainder of the slip is then drained from the mould; the mould is subsequently opened and the article removed.

A very significant advantage of the domed sinker portion 20 is that, as will be appreciated from the drawing, even when the mould is full of slip the wetted surface around the dome edge 23 is very small which means that cleaning of the sinker portion 20 for the next casting operation is very easy and very quick; the operator has only to wipe around the dome edge 23 to about $\frac{3}{4}''$ up from the edge. Such a quick and easy cleaning operation is very much better than the laborious cleaning required when using a sinker without a dome.

The fact that the dome traps a quantity of air which is automatically put under slight pressure when the mould is filled possible gives the added benefit of automatically providing a reservoir of air inside the mould which can expand as surplus slip is drained off, and as mentioned it may be possible to use this to prevent a suction effect occurring in the mould which would otherwise distort the piece.

Whilst in the example illustrated the dome 21 is formed integrally in the rim mould part 17, it would of course be quite possible to provide the dome in a separate sinker part made, for example, of glass fibre reinforced plastics, and which fits into a central oval-shaped hole in the rim mould part 17. Such a separate sinker could, for example be made in the form of a dome surrounded by a cylindrical wall, the lower edge of the dome being joined to the lower edge of the cylindrical wall.

With this latter embodiment, after the initial draining to the level 27, it would be possible to remove the sinker leaving the open rim mould part in position, for draining the remainder of the slip. When using a separate sinker in this way, it must be clamped to the rim mould part to prevent it rising when slip is introduced into the mould. This may be done by an external clamping arrangement or alternately it may be possible for the sinker to be self-retaining by virtue of its oval shape, the sinker being inserted and rotated slightly to engage under a lip of the rim mould part.

The use of the dome 21 in the mould is particularly advantageous in multiple casting of water-closet bowls in a plurality of such moulds arranged in a line since, because all the moulds are closed they can be filled with slip under pressure and excess slip can be drained using air under pressure, and when emptying the moulds and preparing them for a fresh casting cycle, the cleaning of each dome edge in turn is quick and easy, thereby giving a saving in operator time.

What is claimed is:

1. A mould for casting a toilet bowl of ceramic material in slip form, to mould the article in upright position said mould comprising:

a wall defining a casting energy in which an article to be cast is shaped;

said mould having an inlet through which slip is introduced into said casting cavity, air vent means through which air disposed in said casting cavity is displaced when the casting cavity is filled with slip and an outlet for draining excess slip from the mould;

said air vent means being disposed in the uppermost region of said casting cavity;

an unvented compartment means for housing a volume of air therein;

said compartment means being defined by a wall which is impermeable to air and which is upwardly closed and downwardly in open communication with the casting cavity in a position such as to correspond to an opening in said bowl;

said open end of the compartment means being positioned below the air vent means so that said volume of air provides a surface against which slip will not adhere whereby said cast article is formed having an opening in the region of said compartment means.

2. The mould of claim 1 wherein said air vent means is the seam formed between two parts of the mould, the seam being of such dimension that once the slip covers the seam the latter becomes blocked.

3. The mould of claim 1 wherein the compartment is provided integrally in a mould part which is made of plaster, the internal surface of the compartment being rendered impermeable to air.

4. The mould of claim 3 wherein the internal surface of the compartment is rendered impermeable to air by a resin or plastics coating applied thereto.

5. The mould of claim 1 wherein the compartment is provided in a separate part which is made of air impermeable material and which is assembled with the other part or parts of the mould made of plaster.

6. The mould of claim 5 wherein the separate part having the compartment is made of plastics material.

7. The mould of claim 1 wherein the compartment is dome shaped.

8. The mould of claim 7 wherein the compartment is provided in a closure member of a mould for drain casting of water-closet bowls.

9. The mould of claim 8 wherein the compartment is provided centrally in the closure member in a portion thereof which projects down into the mould cavity, the lower rim of the compartment occupying substantially the entire region where the open rim of the water-closet bowl is to be formed.

10. The mould of claim 9 wherein the closure member includes a plaster portion for shaping an integrally-cast flush-water rim on the water-closet bowl.

11. A method for casting bowl shaped article from ceramic material in slip form using a mould having a compartment means for housing a volume of air therein; said compartment means being defined by a wall which is impermeable to air and which is upwardly closed and downwardly in open communication with the casting cavity of the mould and forming an opening in said bowl shaped article, said method comprising:

placing the mould in a casting position so that the plane of the open end of said compartment means is substantially parallel to the surface supporting the mould so that the volume of air in said compartment means is trapped providing a surface of air against which slip will not adhere;

filling the casting cavity with slip except for said compartment, and displacing the air therein except from the unvented compartment and forming an aperture in said article at the location of the open end of the compartment means and the casting cavity of the mould;

draining excess slip from the mould including the slip disposed against said surface of air through an outlet so that when the cast article is removed from the mould an aperture is formed in the cast article corresponding to the location of the open end of the compartment means and the casting cavity of the mould.

12. An installation for casting toilet bowls of ceramic material in slip form moulding said articles in upright position, comprising:

a plurality of moulds arranged in a line, each mould including a casting cavity in which an article to be cast is shaped;

said mould having an inlet through which slip is introduced into said casting cavity, air vent means through which air disposed in said casting cavity is displaced when the casting cavity is filled with slip and an outlet for draining excess slip from the mould;

said air vent means being disposed in the uppermost region of said casting cavity;

an unvented compartment means for housing a volume of air therein; said compartment means being defined by a wall which is impermeable to air and which is upwardly closed and downwardly in open communication with the casting cavity in a position such as to correspond to an opening in each of said bowls;

said open end of the compartment means being positioned below said air vent means so that said volume of air provides a surface against which slip will not adhere whereby said cast article is formed having an opening in the region of said compartment means.

* * * * *